United States Patent

[11] 3,618,845

| [72] | Inventor | Luther D. Totten |
| | | 619 Spring, Mount Shasta, Calif. 96067 |
| [21] | Appl. No. | 818,864 |
| [22] | Filed | Apr. 24, 1969 |
| [45] | Patented | Nov. 9, 1971 |

[54] PRESSURE WELDING APPARATUS
6 Claims, 6 Drawing Figs.

[52] U.S. Cl. ................................................. 228/44,
29/493, 219/101, 228/49, 285/21
[51] Int. Cl. .................................................... B23k 19/00
[50] Field of Search ........................................ 228/44, 49,
4; 29/493, 470.3; 219/101; 285/21

[56] References Cited
UNITED STATES PATENTS

| 3,527,398 | 9/1970 | Gersbacher | 228/44 |
| 3,239,209 | 3/1966 | Kucka | 228/49 X |
| 3,120,138 | 2/1964 | Ronay | 228/44 |
| 3,065,536 | 11/1962 | Chapman | 29/493 |
| 2,988,936 | 6/1961 | Cash | 228/44 X |
| 2,805,319 | 9/1957 | Totten | 219/101 |

Primary Examiner—John F. Campbell
Assistant Examiner—R. L. Craig
Attorney—Robert K. Rhea ABSTRACT: A generally horizontal frame adjustably holds crossmembers which in turn supports material holding dies gripped by pressure cylinder operated clamp means. A portion of one crossmember is movable toward the other to adjustably align the ends of the material to be welded. Pressure operated linkage forcibly abuts the heated ends of material being welded.

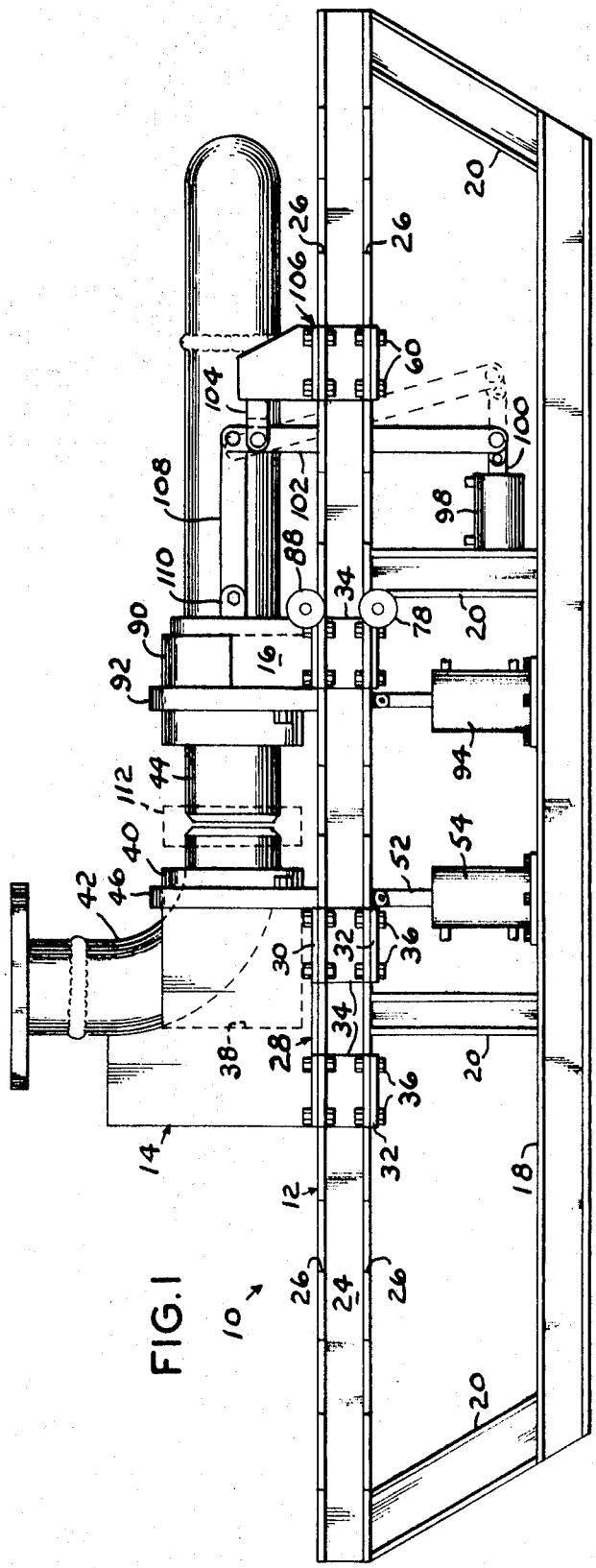
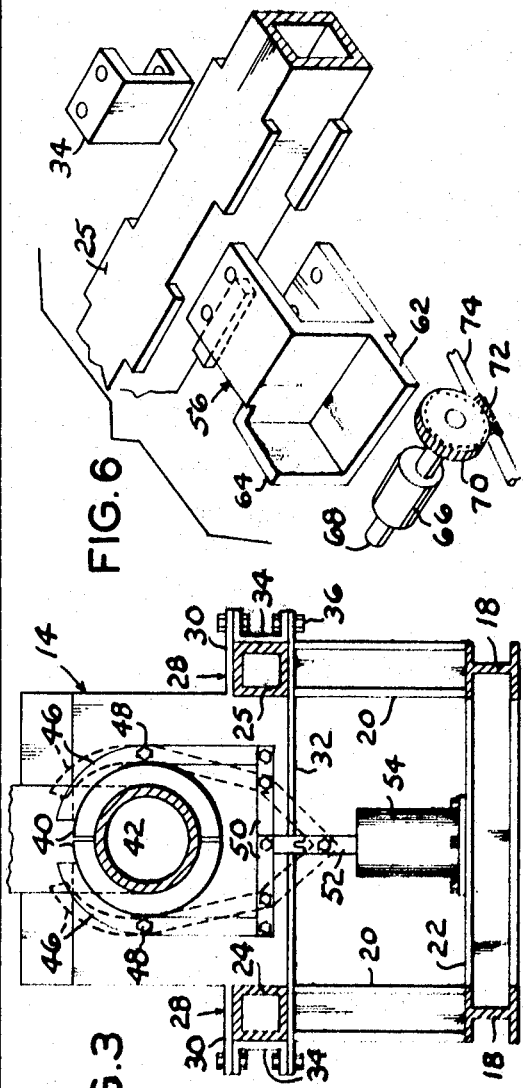

3,618,845
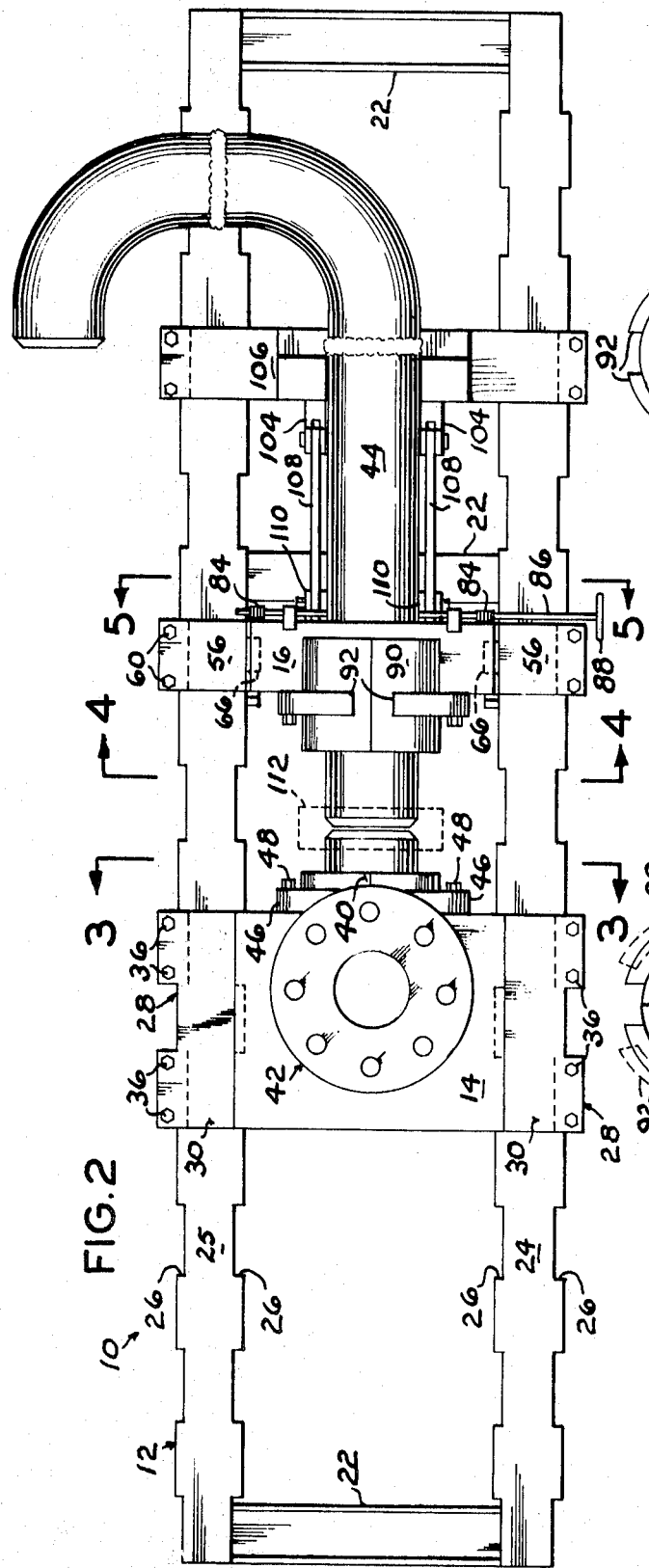
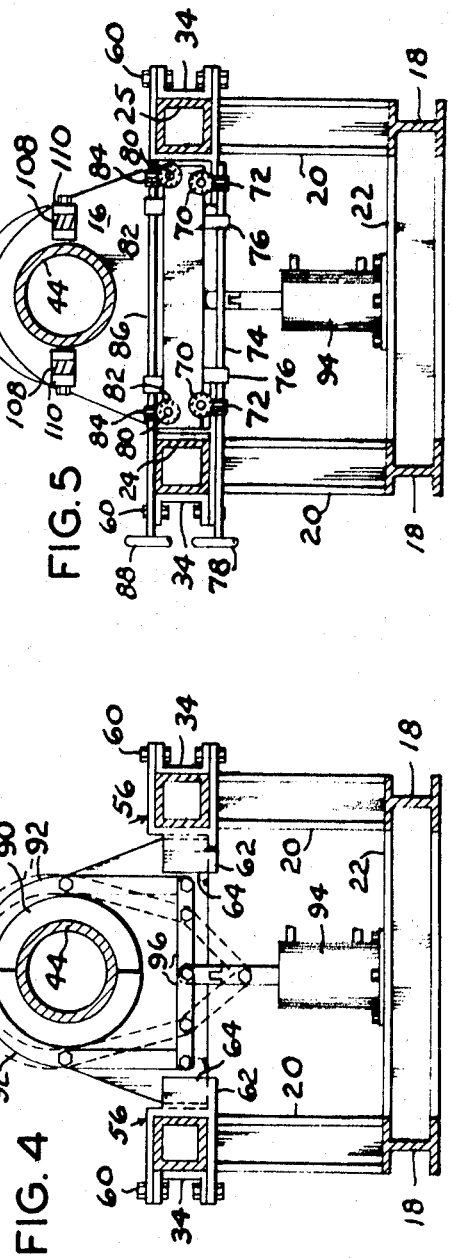
LUTHER D. TOTTEN
INVENTOR.
BY
Robert K. Rhea
AGENT

PRESSURE WELDING APPARATUS

BACKGROUND OF THE INVENTION

The present invention relates to welding abutted ends of material and more particularly to the class of welding commonly referred to as pressure welding.

Pressure welding is a method of joining the adjacent ends of pipe or the like, by a controlled application of heat and pressure. In pressure welding sections of pipe together a pair of circular burners are provided which surround the adjacent end of the two sections of pipe. The burners are operatively connected with a source of fuel such as oxygen and acetylene. The burner flame is directed toward the oppositely disposed ends of the pipe for heating the same. When the metal has been heated sufficiently the two ends of the pipe are forced together by power means which causes the adjacent ends of the pipe to be bonded by diffusion and recrystallization. While similar in principle to forge and resistance welding, pressure welding is different in that the parts to be joined are not heated to the fusion temperature. This type of weld is difficult to make unless sufficient power is available to force the heated ends of the metal together at the proper instant. This forcing of the two ends together with sufficient pressure heretofore has not been found practical when using pressure cylinders as the force joining end surfaces are of relatively large area.

The present invention provides a means in the form of material holding dies and clamps adjustably positioned along a horizontal frame so that one of the dies and clamps may be forcibly moved toward the other by hydraulic means under sufficient pressure to achieve a pressure weld.

My U.S. Pat. No. 2,761,952 for Welding Frame discloses a welding apparatus which generates sufficient pressure to achieve pressure welding but this patent has the disadvantage of numerous components of relatively heavy construction and is, therefore, not economically feasible for pressure welding of various sizes of material. This invention, on the other hand, is constructed of relatively few parts and is adaptable for a wide range of sizes and kinds of material to be pressure welded by simply changing the material holding dies. This invention will satisfactorily weld a wide rang of metallic components formed of metals commonly known as stainless steel, Monel, titanium, chrome-alloy and the high-tensil steels known as T1 and T2.

SUMMARY OF THE INVENTION

A generally horizontal frame, having upper parallel rails, adjustably supports transverse members on which are mounted clamp arms. The clamp arms, releasably operated by hydraulic cylinders, grip split dies which in turn support the components to be welded together. ONe of the die holders is adjustable vertically and laterally of the frame for accurately aligning the ends to be welded. Hydraulically operated levers, connected with the movable die, forces the material held by the die toward the other member to which it is to be welded when the adjacent ends to be welded are heated to a selected temperature. In addition, to gripping the components to be welded together the hydraulically operated clamps and dies force-round tubular members into concentric relation before the welding action while the lever means generates sufficient pressure on a ratio of at least 12 to 1 to accomplish the weld.

The principal object of this invention is to provide an apparatus for metallic fabrication by holding and aligning components to be pressure welded and forcing adjacent heated ends of the components together under sufficient pressure to consummate a pressure weld without the use of inert gases.

BRIEF DESCRIPTION OF THE DRAWINGS

FIG. 1 is a side elevational view of the device in operative position;

FIG. 2 is a top view of FIG. 1;

FIGS. 3, 4 and 5, are vertical cross-sectional views taken substantially along the lines 3—3, 4—4 and 5—5 of FIG. 2; and, FIG. 6 is a fragmentary exploded perspective view of the beam clamping members and die holding member adjusting cams.

DESCRIPTION OF THE PREFERRED EMBODIMENT

Like of reference designate like parts in those figures of the drawings in which they occur.

In the drawings:

The reference numeral 10 indicates the device, as a whole, comprising a frame 12 having clamp and die support members 14 and 16 mounted thereon. The frame 12 comprises parallel I-beam base members 18 interconnected by uprights 20 and cross braces 22 to a pair of parallel horizontally disposed beams or rails 24 and 25. The rails 24 and 25 are preferably formed of box-channel material to provide sufficient rigidity for their function as hereinafter described. The horizontal rails 24 and 25 are preferably provided with upper and lower laterally projecting flanges. The respective upper and lower flanges of the rails 24 and 25 are provided with a plurality of inwardly projecting equally spaced-apart rectangular indentations 26 or recesses. The die support 14 is substantially rectangular in overall configuration and extends transversely across and between the rails 24 and 25 and is adjustably connected longitudinally to the rails 24 and 25 by clamp means 28. The clamp means 28 comprises upper and lower flanges 30 and 32 slidably contacting the respective upper and lower surfaces of the respective rail 24 and 25. A U-shaped lock member 34 (FIG. 6) is removably received by the upper and lower flanges of the respective rails within the respective recess 26 and held in place by bolts and nuts 36. Thus, the die support 14 may be positioned at any desired location longitudinally of the rails 24 and 25 which positioning is limited only by the position of the respective recess 26. The die support 14 is provided with a recess 38 which removably receives a split die 40, shown cylindrical in shape but which obviously may be of any desired external configuration and having a recess formed to cooperatively surround a section of material, such as a tubular elbow 42, to be welded to a length of pipe 44 as hereinafter explained.

The die 40 is further held in place, in gripping relation with respect to the elbow 42, by clamp arms pivotally connected, intermediate their ends, as at 48, to the die support 14. The depending ends of the clamp arms 46 are connected by links 50 with the free end of a piston rod 52 operated by a double acting hydraulic cylinder 54 in turn supported by one of the cross braces 22.

The die support rails 16 is of such length that its respective end surfaces are disposed inwardly of the inner limit of the rails 24 and 25. Each end of the die support 16 is supported between the rails by a U-shaped clamp 56 having its legs slidably projecting across the respective upper and lower surfaces of the rails 24 and 25 and held in place within one of the indentations 26 by the U-shaped lock members 34, forming a part of the clamp 56, and connected thereto by bolts and nuts 60. The clamp 56 includes an inwardly directed upwardly open socket opposite its leg members of substantially L-shape having one horizontally disposed leg member 62 which slidably supports the respective end of the die support 16 and a forwardly positioned upright leg member 64 which limits the forward movement of the die support 16 toward the die support 14 in the manner presently described.

The die support 16 is supported within the respective L-shaped sockets above the respective legs 62 by cams 66 connected with a shaft 68 transversely journaled by the die support 16. One end of the shaft 68 projects laterally of the die support 16, opposite the die support 14, and is coaxially connected with gear 70 meshing with the teeth of a worm gear 72 coaxially connected with a control rod 74 journaled by ears 76 connected to the die support 16 so that one end of the control rod 74 projects laterally of the rail 24 and is coaxially connected with a control wheel 78. Thus rotation of the control wheel 78 raises and lowers the die support 16 with respect to the rails 24 and 25 for aligning the pipe 44 in the manner hereinafter described.

Identical cams, not shown, mounted on axles 80 and connected with gears 82, are interposed between the respective ends of the die support 16 and the adjacent surface of the bight portion of the U-shaped clamps 56. The gears 82 are in mesh with worm gears 84 mounted on a similar control rod 86 having a control wheel 88 so that rotation of the control wheel 88 moves the die support 16 transversely of the frame. Thus, the control wheels 78 and 88 moves the die support 16 laterally or up and down to accurately align the end of the pipe 44 with the elbow 42.

The die support 16 nests a split die 90 which surrounds a circumferential portion of the pipe 44. The die 90 is removably held in place by a pair of clamp arms 92 similar to the clamp arms 46, and operated by a second double acting hydraulic cylinder 94 connected to the clamp arms 92 by 102 104 A third double acting hydraulic cylinder 98 is connected with one of the frame crossmembers 22 between the base members 18 with its piston rod 100 projecting horizontally rearwardly or away from the cylinder 94. A pair of substantially vertically disposed levers 102 are pivotally connected, at one end, with the piston rod 100 and pivotally connected intermediate their ends by ears 104 mounted on a movable cross brace 106 extended transversely of the frame rails 24 and 25 in spaced relation with respect to the die support 16. A pair of links 108 extends between and are connected at their respective ends to the upper ends of the levers 102 and with ears 110 mounted on the die support 16 opposite the clamp arms 92. Thus actuation of the cylinder 98, to move its piston rod 100 outwardly of the cylinder, pivots the levers 102 about the horizontal axis formed by their connection with the ears 104 which forcibly moves the die support 16 and the pipe 44 toward the elbow 42 under sufficient pressure to form a pressure weld.

OPERATION

In operation the die supports 14, 16 and cross member 106 are positioned longitudinally of the frame at a desired location, which depends upon the dimensions of the material to be pressure welded. Material to be welded, such as the elbow 42 and the tube 44, are positioned within the dies 40 and 90, respectively, and held in place within the die supports 14 and 16 by the respective pair of clamp arms 46 and 92. The cylinders 54 and 94 maintain the dies in gripping relation with respect to the elbow 42 and tube 44. The die support 16 is adjusted by the control wheels 78 and 88 so that the adjacent ends of the elbow 42 and tube 44, to be welded, are in close spaced aligned relation. An oxygen-acetylene burner means, indicated by the dotted lines at 112, and surrounding the weld area is operated to heat the adjacent end portions of the elbow 42 and 44. When a welding temperature for these end portions has been reached, which varies in accordance with the type of material being welded, as understood by those skilled in the art, the hydraulic cylinder 98 is operated to extend its piston rod 100 which forcibly and quickly moves the die support 16 toward the die support 14 thus abutting the tube 44 with the adjacent end portion of the elbow 42. This action diffuses the two heated end portions being welded together which causes a slight upsetting of the material and completes the weld by recrystallation. Thereafter the clamp arms 46 and 92 are released and the welded structure removed from the dies 40 and 90.

Obviously the invention is susceptible to some change or alteration without defeating its practicability, and I therefore do not wish to be confined to the preferred embodiment shown in the drawings and described herein.

I claim:

1. A pressure welding apparatus, comprising: frame means including a pair of spaced-apart rails said rails each having a plurality of opposing spaced-apart flanged edge portions extending longitudinally of said rails and defining a plurality of recesses therebetween; die support means extending transversely of said rails; adjustable means comprising substantially U-shaped clamps extending transversely across the respective said rail and connecting said die support means longitudinally of said rails U-shaped lock members nested by respective ones of said rail recesses and connected with said U-shaped clamps; a split die removably supported by each said die support means; clamp arm means gripping each said die means; and lever means forcibly moving one said die support means longitudinally of said rails 2. Structure as specified in claim 1 in which said die support means comprises a pair of crossmembers having oppositely disposed upwardly open die receiving recesses facing toward each other in aligned relation.

3. Structure as specified in claim 2 in which each said clamp arm means comprises a pair of substantially vertically disposed clamp arms pivotally connected intermediate their ends to the respective said die support means and releasably surround each respective said die; a pressure operated cylinder supported by said frame means, said cylinder having a piston rod; and links connecting said piston rod with said clamp arms.

4. Structure as specified in claim 3 in which the lever means comprises a third crossmember adjustably secured transversely of said rails; a pair of levers pivotally secured intermediate their ends to said crossmember; a third pressure cylinder having a piston rod pivotally connected with one end of said pair of levers; and links interconnecting the other ends of said pair of levers with said one die support means 5. Structure as specified in claim 4 in which said U-shaped clamps are each provided with L-shaped members each having a leg projecting inwardly of each said rail and forming an upwardly open socket for slidably receiving the respective end portion of said one die support means; and means connected with the respective end portions of the last mentioned die support means for moving the latter vertically and laterally with respect to said rails.

6. Structure as specified in claim 5 in which the last mentioned means comprises cams interposed between the depending surface of the respective end portion of the last mentioned die support means and the leg of said L-shaped member and between the end surfaces of the last mentioned die support means and the bight portion of said U-shaped clamps, respectively a gear coaxially connected with each said cam; at least one control shaft journaled by said die support means; and a like number of worm gears on said control shaft and meshing with respective said gear.

* * * * *